United States Patent
Bae et al.

(10) Patent No.: US 11,255,729 B2
(45) Date of Patent: Feb. 22, 2022

(54) APPARATUS AND METHOD FOR MONITORING STABILITY OF SPECTRUM

(71) Applicant: SAMSUNG ELECTRONICS CO., LTD., Suwon-si (KR)

(72) Inventors: Sang Kon Bae, Seongnam-si (KR); Yun S Park, Suwon-si (KR); So Young Lee, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 521 days.

(21) Appl. No.: 15/450,483

(22) Filed: Mar. 6, 2017

(65) Prior Publication Data

US 2018/0106678 A1    Apr. 19, 2018

(30) Foreign Application Priority Data

Oct. 18, 2016 (KR) .................. 10-2016-0135192

(51) Int. Cl.
| | |
|---|---|
| *G01J 3/457* | (2006.01) |
| *G01J 3/28* | (2006.01) |
| *G01J 3/02* | (2006.01) |
| *G06F 17/18* | (2006.01) |

(52) U.S. Cl.
CPC ............. *G01J 3/457* (2013.01); *G01J 3/027* (2013.01); *G01J 3/28* (2013.01); *G06F 17/18* (2013.01); *G01J 2003/2853* (2013.01)

(58) Field of Classification Search
CPC .................................................. G01J 3/457
See application file for complete search history.

(56) References Cited

U.S. PATENT DOCUMENTS

| | | | |
|---|---|---|---|
| 5,539,207 A | | 7/1996 | Wong |
| 5,596,135 A | * | 1/1997 | Mito .................. G01N 30/8624 |
| | | | 702/179 |
| 6,040,194 A | | 3/2000 | Chick et al. |
| 6,864,978 B1 | | 3/2005 | Hazen et al. |
| 7,038,774 B2 | | 5/2006 | Hazen et al. |
| 7,203,345 B2 | | 4/2007 | Rowe et al. |
| 8,295,901 B2 | | 10/2012 | Tobola et al. |
| 8,452,716 B2 | | 5/2013 | Howley et al. |
| 9,025,850 B2 | | 5/2015 | Diem et al. |
| 2003/0123057 A1 | | 7/2003 | Lemmo et al. |

(Continued)

FOREIGN PATENT DOCUMENTS

| | | |
|---|---|---|
| EP | 1992939 A1 | 11/2008 |
| JP | 09297062 A * | 11/1997 ......... G01N 21/3563 |

(Continued)

OTHER PUBLICATIONS

JP-09297062A, Kreuchwig et al., (Machine Englished-translated version)(1997).*

(Continued)

*Primary Examiner* — Hyun D Park
(74) *Attorney, Agent, or Firm* — Sughrue Mion, PLLC

(57) ABSTRACT

An apparatus and method for monitoring a stability of a spectrum are provided. The apparatus for monitoring stability of a spectrum includes a spectroscope configured to measure a spectrum of a sample and a processor configured to calculate a similarity change index of the measured spectrum and to determine the stability of the measured spectrum by analyzing the calculated similarity change index.

10 Claims, 24 Drawing Sheets

(56) References Cited

U.S. PATENT DOCUMENTS

| | | | |
|---|---|---|---|
| 2004/0096982 A1* | 5/2004 | Barnea | G16C 20/20 |
| | | | 436/173 |
| 2004/0223155 A1 | 11/2004 | Hazen et al. | |
| 2015/0335248 A1 | 11/2015 | Huang et al. | |
| 2016/0089088 A1 | 3/2016 | Kim et al. | |
| 2016/0168986 A1* | 6/2016 | Hurst | G01N 21/33 |
| | | | 356/436 |
| 2017/0079565 A1 | 3/2017 | Choi et al. | |

FOREIGN PATENT DOCUMENTS

| | | | |
|---|---|---|---|
| JP | 2004248819 A | 9/2004 | |
| JP | 2005102926 A | 4/2005 | |
| JP | 200655528 A | 3/2006 | |
| JP | 2011220993 A | 11/2011 | |
| KR | 1020170035675 A | 3/2017 | |
| WO | 0225233 A2 | 3/2002 | |

OTHER PUBLICATIONS

JP-09297062A, Kreuchwig et al., Copy of the Original Document (1997).*
Communication dated Oct. 27, 2017, issued by the European Patent Office in counterpart European Application No. 17163048.6.

* cited by examiner

FIG. 5A

| 1ST SPECTRUM (S1) | 2ND SPECTRUM (S2) | 3RD SPECTRUM (S3) | 4TH SPECTRUM (S4) | 5TH SPECTRUM (S5) | ... | 149TH SPECTRUM (S149) | 150TH SPECTRUM (S150) | sa1, sa2, sa147

FIG. 6A

APPARATUS AND METHOD FOR MONITORING STABILITY OF SPECTRUM

CROSS-REFERENCE TO RELATED APPLICATION(S)

This application claims priority from Korean Patent Application No. 10-2016-0135192, filed on Oct. 18, 2016, in the Korean Intellectual Property Office, the disclosure of which is incorporated herein by reference in its entirety for all purposes.

BACKGROUND

1. Field

Exemplary embodiments relate to an apparatus and method for monitoring stability of a spectrum.

2. Description of Related Art

A spectrum is generally used to observe a rainbow of colors in visible light when separated by using a tool, such as a prism. In a broad sense, a spectrum applies to any technologies which decompose a complex signal that includes one or two signals and provide a graphical representation of the signal.

Recently, a method of analyzing properties of an object by analyzing a spectrum of light that has propagated through the object for a specific period of time has been studied. In the case of an infrared spectrum, particularly, for electromagnetic wavelengths between 0.75 μm and 1 mm, this methodology can be used in most conditions, such as gases, liquids, crystals, amorphous solids, polymers and solutions, and can be widely applied to the identification, qualitative or quantitative analysis of compounds.

In order to improve the accuracy of spectrum-based analysis, it is important to select the spectrum to be used for analysis so that the spectrum does not contain information (e.g., noise) other than the information required for analysis. Whether or not the noise is included in a spectrum may be determined based on a similarity between spectra, and the similarity between the spectra is related to the stability of the measured spectrum.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, there is provided an apparatus for monitoring a stability of a spectrum including: a spectroscope configured to measure a spectrum of a sample; and a processor configured to calculate a similarity change index of the measured spectrum and to determine the stability of the measured spectrum by analyzing the calculated similarity change index.

The spectroscope may include a photodetector configured to detect light reflected from or propagated through the sample, and a spectrum obtainer configured to acquire the spectrum by performing spectroscopy with respect to the detected light.

The apparatus may further include a light source configured to emit light onto the sample.

The processor may be further configured to calculate a degree of similarity between spectra and to calculate the similarity change index based on the calculated degree of similarity.

The processor may be further configured to calculate the degree of similarity between spectra by using a similarity measurement algorithm, the similarity measurement algorithm comprising at least one from among a Euclidean distance, a Manhattan distance, a cosine distance, a Mahalanobis distance, a Jaccard coefficient, an extended Jaccard coefficient, a Pearson's correlation coefficient, and a Spearman's correlation coefficient.

The processor may be further configured to calculate a degree of similarity between an initial spectrum and a subsequent spectrum and to calculate the similarity change index by converting the calculated degree of similarity into a score.

The processor may be further configured to calculate at least two degrees of similarity between an initial spectrum and a subsequent spectrum, to calculate a change between a first one of the calculated degrees of similarity and a second one of the calculated degrees of similarity, and to calculate the similarity change index by converting the calculated change into a score.

The processor may be further configured to calculate degrees of similarity between any two spectra from among a predetermined number of consecutive spectra, to compute an average of the calculated degrees of similarity, and to calculate the similarity change index by converting the computed average into a score.

The processor may be further configured to compare the similarity change index with a preset threshold value and to determine the stability of the spectrum based on a result of the comparison.

The processor may be further configured to calculate a first similarity change index by calculating a degree of similarity between an initial spectrum and a subsequent spectrum and converting the calculated degree of similarity into a first score, to calculate a second similarity change index by converting a change of the calculated degree of similarity into a second score, and to calculate a third similarity change index by calculating at least two degrees of similarity between any two spectra from among a predetermined number of consecutive spectra and converting an average of the calculated at least two degrees of similarity into a third score.

The processor may be further configured to compare the first similarity change index with a preset first threshold value, to compare the second similarity change index with a preset second threshold value, and to compare the third similarity change index with a preset third threshold value, and to determine the stability of the spectrum by integrating results of the three comparisons.

The processor may be further configured to control the spectroscope to re-measure a spectrum of the sample in response to a determination that the spectrum is unstable.

In another general aspect, there is provided a method for monitoring a stability of a spectrum, including: measuring a spectrum of a sample; calculating a similarity change index of the measured spectrum; and determining the stability of the spectrum by analyzing the calculated similarity change index.

The measuring of the spectrum of the sample may include emitting light onto the sample, detecting light reflected from or propagated through the sample, and acquiring the spectrum by performing spectroscopy with respect to the detected light.

The calculating of the similarity change index may include calculating a degree of similarity between spectra and calculating the similarity change index based on the calculated degree of similarity.

The calculating of the degree of similarity between the spectra may include using a similarity measurement algorithm, the similarity measurement algorithm comprising at least one from among a Euclidean distance, a Manhattan distance, a cosine distance, a Mahalanobis distance, a Jaccard coefficient, an extended Jaccard coefficient, a Pearson's correlation coefficient, and a Spearman's correlation coefficient.

The calculating of the similarity change index may include calculating a degree of similarity between an initial spectrum and a subsequent spectrum and calculating the similarity change index by converting the calculated degree of similarity into a score.

The calculating of the similarity change index may include calculating at least two degrees of similarity between an initial spectrum and a subsequent spectrum, calculating a change between a first one of the calculated degrees of similarity and a second one of the calculated degrees of similarity, and calculating the similarity change index by converting the calculated change into a score.

The calculating of the similarity change index may include calculating at least two degrees of similarity between any two spectra from among a predetermined number of consecutive spectra, calculating an average of the calculated degrees of similarity, and calculating the similarity change index by converting the calculated average into a score.

The determining of the stability of the spectrum may include comparing the similarity change index with a preset threshold value and determining the stability of the spectrum based on a result of the comparison.

The method may further include, in response to a determination that the spectrum is unstable, re-measuring a spectrum of the sample.

In still another general aspect, there is provided an apparatus for monitoring a stability of a spectrum, including: a communicator configured to receive, from a spectrum measurement apparatus, a spectrum of a sample measured in real time; and a processor configured to calculate a similarity change index based on the received spectrum of the sample and to determine the stability of the spectrum by using the calculated similarity change index.

The processor may be further configured to calculate a degree of similarity between an initial spectrum and a subsequent spectrum and to calculate the similarity change index by converting the calculated degree of similarity into a score.

The processor may be further configured to calculate at least two degrees of similarity between an initial spectrum and a subsequent spectrum, to calculate a change between a first one of the calculated degrees of similarity and a second one of the calculated degrees of similarity, and to calculate the similarity change index by converting the calculated change into a score.

The processor may be further configured to calculate at least two degrees of similarity between any two spectra from among a predetermined number of consecutive spectra, to compute an average of the calculated degrees of similarity, and to calculate the similarity change index by converting the computed average into a score.

The processor may be further configured to compare the similarity change index with a preset threshold value and to determine the stability of the spectrum based on a result of the comparison.

In response to a determination that the spectrum is unstable, the processor may be further configured to generate a control signal that causes the spectrum measurement apparatus to re-measure a spectrum of the sample.

Other features and aspects will be apparent from the following detailed description, the drawings, and the claims.

BRIEF DESCRIPTION OF THE DRAWINGS

FIG. 5A is a diagram for describing a method for calculating a third similarity change index.

FIG. 6A is a diagram for describing a method for calculating a fourth similarity change index.

Figure 1:
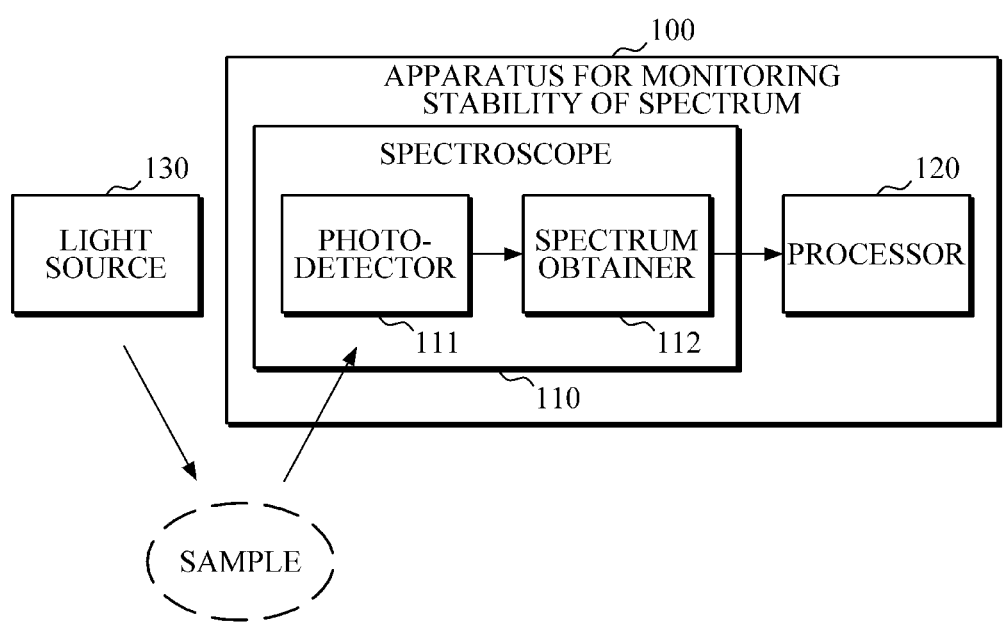
FIG. 1 is a block diagram illustrating an exemplary embodiment of an apparatus for monitoring a stability of a spectrum.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. In the following description, a detailed description of known functions and configurations incorporated herein will be omitted when it may obscure the subject matter with unnecessary detail.

It should be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Terms described below are selected by considering functions in the exemplary embodiment, and meanings may vary depending on, for example, a user or operator's intentions or customs. Therefore, in the following exemplary embodiments, when terms are specifically defined, the meanings of terms should be interpreted based on definitions, and otherwise, should be interpreted based on general meanings recognized by those of ordinary skill in the art.

As used herein, the singular forms are intended to include the plural forms as well, unless the context clearly indicates otherwise. It will be further understood that the terms "comprises" and/or "comprising," or "includes" and/or "including" when used in this description, specify the presence of stated features, numbers, steps, operations, elements, components or combinations thereof, but do not preclude the presence or addition of one or more other features, numbers, steps, operations, elements, components or combinations thereof.

It will also be understood that the elements or components in the following description are discriminated in accordance with their respective primary functions. In this aspect, two or more elements may be made into one element or one element may be divided into two or more elements in accordance with a subdivided function. Additionally, each of the elements in the following description may perform a part or whole of the function of another element as well as its primary function, and some of the primary functions of each of the elements may be performed exclusively by other elements. Each element may be realized in the form of a hardware component, a software component, and/or a combination thereof.

FIG. 1 is a block diagram illustrating one exemplary embodiment of an apparatus for monitoring a stability of a spectrum. The apparatus 100 for monitoring the stability of a spectrum may be an apparatus which can determine the stability of the spectrum in real time by calculating and analyzing an index of similarity change (hereinafter, this index will be referred to as a "similarity change index") based on a degree of similarity between spectra. In particular, the similarity change index is a measure of the trend of change in similarity between spectra. A larger value of the similarity change index may indicate either a larger degree of similarity change or a smaller degree of similarity.

The apparatus 100 may be implemented by a software module or manufactured in the form of hardware chip and mounted in an electronic device. In this aspect, the electronic device may include any of a mobile phone, a smartphone, a tablet computer, a notebook computer, a personal digital assistant (PDA), a portable multimedia player (PMP), a navigation system, an MP3 player, a digital camera, a wearable device, and the like, and the wearable device may include any of various types of wearable devices, such as a wristwatch type, a wrist band type, a ring type, a belt type, a necklace type, an ankle band type, a thigh band type, a forearm band type, and the like. However, the electronic device is not limited to the aforesaid examples, and the wearable device is also not limited to the aforesaid examples.

Referring to FIG. 1, the apparatus 100 for monitoring the stability of a spectrum includes a spectroscope 110 and a processor 120.

The spectroscope 110 may measure a spectrum of a sample. To this end, the spectroscope 110 may include a photodetector 111 configured to detect light that has been reflected from the sample or has propagated through the sample, and a spectrum obtainer 112 configured to obtain a spectrum of the sample by performing spectroscopy with respect to the light detected by the photodetector 111. The photodetector 111 may include any of various photodetectors, such as a photodiode, a photo transistor, and a charge-coupled device (CCD).

The processor 120 may determine the stability of spectrum measured by the spectroscope 110. For example, the processor 120 may compute a degree of similarity between measured spectra and calculate and analyze a similarity change index based on the computed degree of similarity between the spectra so as to determine the stability of the measured spectrum, which will be described below with reference to FIG. 2.

In addition, when it is determined that the measured spectrum is unstable as a result of the stability determination, the processor 120 may control the spectroscope 110 to re-measure the spectrum of the sample, or to correct the spectrum determined to be unstable by using a predetermined algorithm.

Hereinafter, the processor 120 will be described in detail with reference to FIG. 2.

Figure 2:
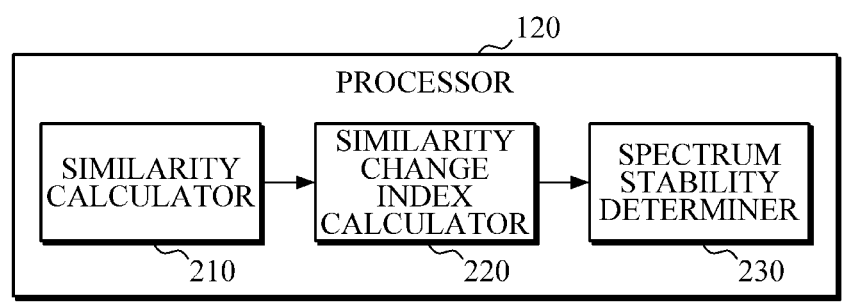
FIG. 2 is a block diagram illustrating an exemplary embodiment of the processor.

FIG. 2 is a block diagram illustrating one exemplary embodiment of the processor.

Referring to FIG. 2, the processor 120 includes a similarity calculator 210, a similarity change index calculator 220, and a spectrum stability determiner 230.

The similarity calculator 210 may compute a degree of similarity between spectra. According to one exemplary embodiment, the similarity calculator 210 may compute the degree of similarity between spectra by using a similarity measurement algorithm that includes at least one from among a Euclidean distance, a Manhattan distance, a cosine distance, a Mahalanobis distance, a Jaccard coefficient, an extended Jaccard coefficient, a Pearson's correlation coefficient, a Spearman's correlation coefficient, and the like.

The similarity change index calculator 220 may calculate a similarity change index on the basis of the computed degree of similarity between spectra. In this case, the similarity change index may be classified into a first similarity change index, a second similarity change index, a third similarity index, and a fourth change index according to data used in an index calculation. For example, the first similarity change index may be calculated based on similarities between the first measured spectrum (hereinafter, the first measured spectrum will be referred to as an "initial spectrum") and spectra measured after the initial spectrum (hereinafter, spectra measured after the initial spectrum will be referred to as a "subsequent spectra"), the second similarity change index may be calculated based on a change of similarity between the initial spectrum and the subsequent spectra, the third similarity change index may be calculated based on an average of the similarities between a predetermined number of consecutive spectra, and the fourth similarity change index may be calculated based on the similarities between adjacent spectra.

According to one exemplary embodiment, the similarity change index calculator 220 may calculate the first similarity change index by converting the degrees of similarity between the initial spectrum and each of the subsequent spectra into respective scores. For example, if five spectra (a first spectrum to a fifth spectrum) are measured, the similarity change index calculator 220 may calculate the first similarity change index by converting a degree of similarity between the first spectrum and the second spectrum, a degree of similarity between the first spectrum and the third spectrum, a degree of similarity between the first spectrum and the fourth spectrum, and a degree of similarity between the first spectrum and the fifth spectrum into scores, respectively.

According to another exemplary embodiment, the similarity change index calculator 220 may calculate the second similarity change index by calculating the change of similarity between the initial spectrum and the subsequent spectra and converting the calculated change into a score. For example, if five spectra (a first spectrum to a fifth spectrum) are measured, the similarity change index calculator 220 may calculate the second similarity change index by converting a difference between a degree of similarity between the first and the second spectra and a degree of similarity between the first and the third spectra, a difference between a degree of similarity between the first and the third spectra and a degree of similarity between the first and the fourth spectra, and a difference between a degree of similarity between the first and the fourth spectra and a degree of similarity between the first and the fifth spectra into scores, respectively.

According to still another exemplary embodiment, the similarity change index calculator 220 may calculate the third similarity change index by calculating an average of the similarities between spectra among a predetermined number of consecutive spectra and converting the calculated average into a score. For example, if five spectra (i.e., a first spectrum to a fifth spectrum) are measured and the predetermined number is set to three (3), the similarity change index calculator 220 may calculate an average of the similarities between any two spectra (i.e., between the first spectrum and the second spectrum, between the first spectrum and the third spectrum, and between the second spectrum and the third spectrum) among the first to third spectra (hereinafter, the first, second, and third spectra will be referred to as a "first section"). In addition, for the second spectrum to the fourth spectrum (hereinafter, the second, third, and fourth spectra will be referred to as a "second section"), the similarity change index calculator 220 may calculate an average of the similarities between any two spectra (i.e., between the second and the third spectra, between the second and the fourth spectra, and between the third and the fourth spectra). Further, for the third to the fifth spectra (hereinafter, the third, fourth, and fifth spectra will be referred to as a "third section"), the similarity change index calculator 220 may calculate an average of the similarities between any two spectra (i.e., between the third and the fourth spectra, between the third and the fifth spectra, and between the fourth and the fifth spectra). The similarity change index calculator 220 may calculate the third similarity change index by converting the calculated averages of the similarities into scores, respectively.

According to yet another exemplary embodiment, the similarity change index calculator 220 may calculate the fourth similarity change index by converting degrees of similarity between adjacent spectra. For example, if five spectra (i.e., a first spectrum to a fifth spectrum) are measured, the similarity change index calculator 220 may calculate the fourth similarity change index by converting a degree of similarity between the first spectrum and the second spectrum, a degree of similarity between the second spectrum and the third spectrum, a degree of similarity between the third spectrum and the fourth spectrum, and a degree of similarity between the fourth spectrum and the fifth spectrum into scores, respectively.

The spectrum stability determiner 230 may compare the calculated similarity change index with a preset threshold value and determine the stability of the measured spectra on the basis of the comparison result. In this case, the threshold value may be classified into a first threshold value, a second threshold value, a third threshold value, and a fourth threshold value according to the type of the similarity change index, and each threshold value may be set to various values according to the performance and/or purpose of a system.

According to one exemplary embodiment, the spectrum stability determiner 230 may compare the first similarity change index with the first threshold and determine that the measured spectrum is stable when the first similarity change index is equal to or smaller than the first threshold value.

According to another exemplary embodiment, the spectrum stability determiner 230 may compare the second similarity change index with the second threshold value and determine that the measured spectrum is stable when the second similarity change index is equal to or smaller than the second threshold value.

According to still another exemplary embodiment, the spectrum stability determiner 230 may compare the third similarity change index with the third threshold value and determine that measured spectrum is stable when the comparison result shows that the third similarity change index is equal to or smaller than the third threshold value.

According to yet another exemplary embodiment, the spectrum stability determiner 230 may compare the fourth similarity change index with the fourth threshold value and determine that measured spectrum is stable when the fourth similarity change index is equal to or smaller than the fourth threshold value.

According to another exemplary embodiment, the spectrum stability determiner 230 may compare some or all of the first to fourth similarity change indices with the corresponding threshold values, and determine the stability of the measured spectra by integrating the comparison results.

Figure 3A:
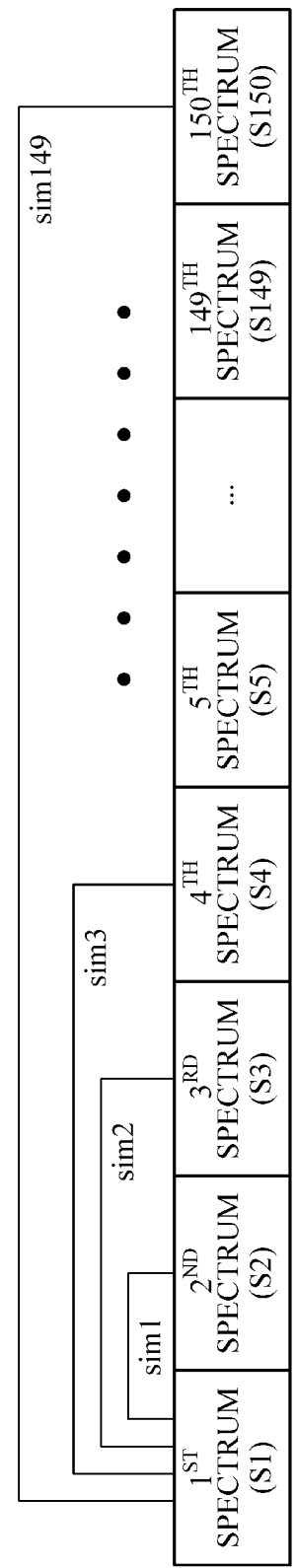
FIG. 3A is a diagram for describing a method for calculating a first similarity change index.
Figure 3B:
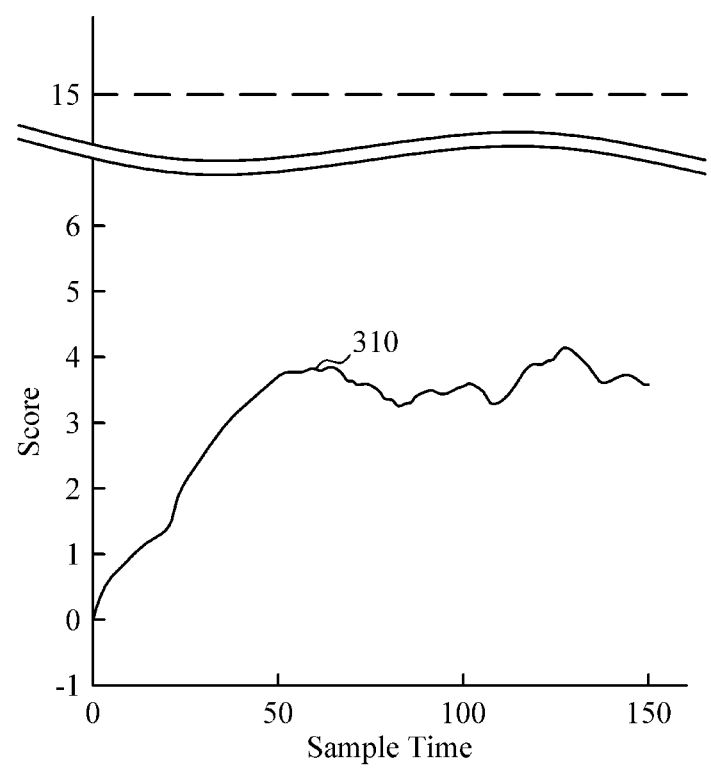
FIG. 3B is a graph showing an example of a result of calculating the first similarity change index.
Figure 3C:
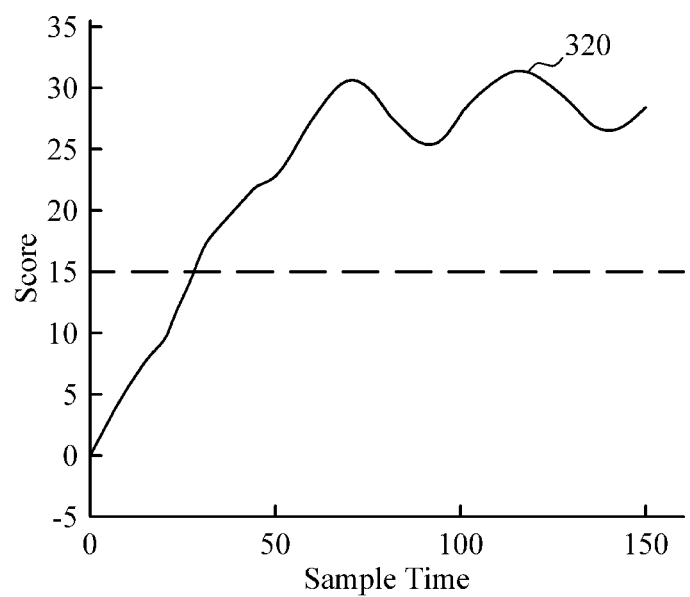
FIG. 3C is a graph showing another example of a result of calculating the first similarity change index.

FIGS. 3A, 3B, and 3C are diagrams for describing a method for determining the stability of spectra. In detail, FIG. 3A is a diagram for describing a method for calculating a first similarity change index, FIG. 3B is a graph showing an example of a result of calculating the first similarity change index, and FIG. 3C is a graph showing another example of a result of calculating the first similarity change index.

Referring to FIGS. 2 and 3A, the similarity calculator 210 calculates a degree of similarity sim1 between a first spectrum S1 and a second spectrum S2, and calculates, in the same manner, degrees of similarity sim2 to sim149 between the first spectrum and each of a third spectrum S3 to a one-hundred and fiftieth spectrum S150.

The similarity change index calculator 220 may calculate the first similarity change index by converting the degrees of similarity sim1 to sim 149 measured by the similarity calculator 210, and the spectrum stability determiner 230 may compare the calculated first similarity change index with a preset first threshold value of 15 and determine that the spectrum is stable when the first similarity change index is equal to or smaller than the first threshold value of 15.

Referring to FIGS. 3B and 3C, a first similarity change index 310 of FIG. 3B is smaller than the first threshold value of 15 at all sample times; while a first similarity change index 320 of FIG. 3C is smaller than the first threshold value of 15 before sample time 25, but is greater than the first threshold value of 15 after the sample time 25. Thus, the spectrum stability determiner 230 may determine that the spectrum measured in FIG. 3B is stable, and may determine that the spectrum measured in FIG. 3C is unstable.

Figure 4A:
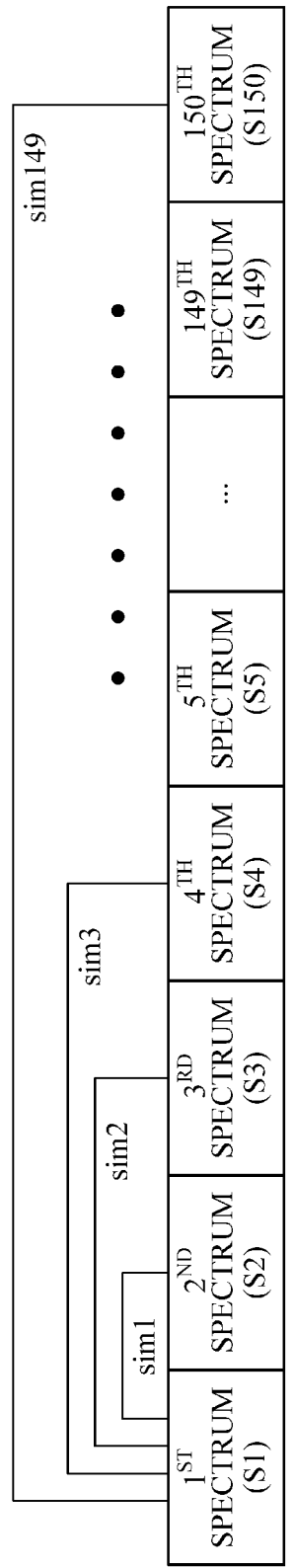
FIG. 4A is a diagram for describing a method for calculating a second similarity change index.
Figure 4B:
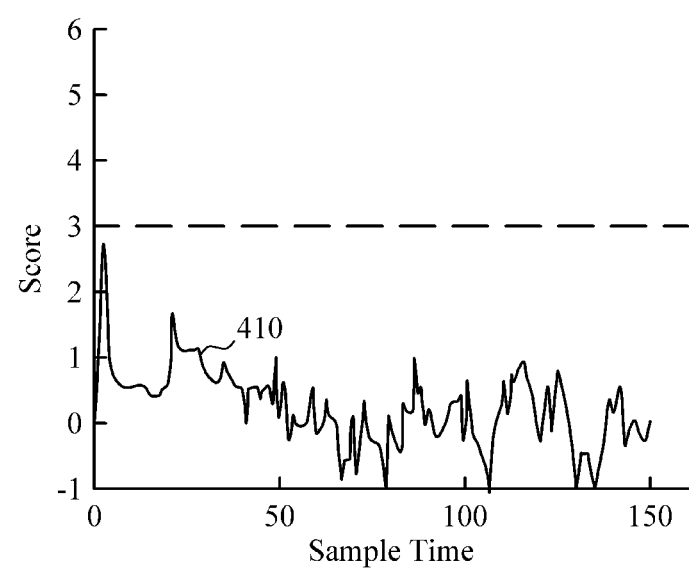
FIG. 4B is a graph showing an example of a result of calculating the second similarity change index.
Figure 4C:
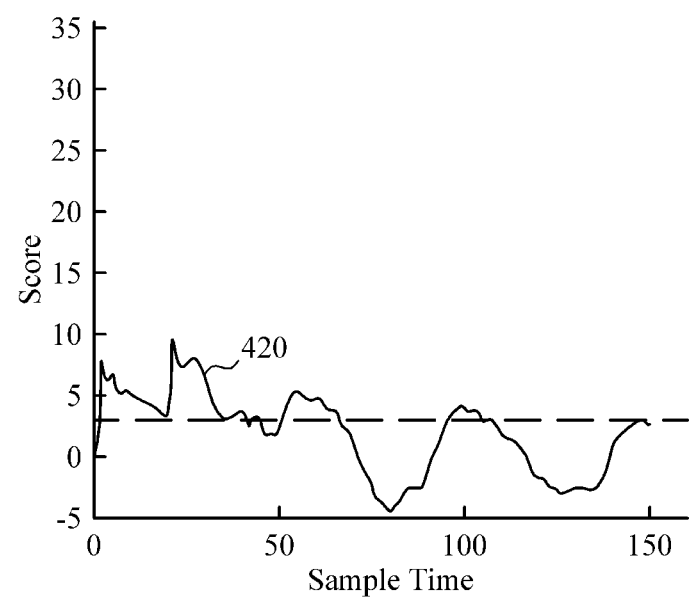
FIG. 4C is a graph showing another example of a result of calculating the second similarity change index.

FIGS. 4A, 4B, and 4C are diagrams for describing a method for determining the stability of spectra. In detail, FIG. 4A is a diagram for describing a method for calculating a second similarity change index, FIG. 4B is a graph showing an example of a result of calculating the second similarity change index, and FIG. 4C is a graph showing another example of a result of calculating the second similarity change index.

Referring to FIGS. 2 and 4A, the similarity calculator 210 calculates a similarity sim1 between a first spectrum S1 and a second spectrum S2, and calculates, in the same manner, similarities sim2 to sim149 between the first spectrum and each of a third spectrum S3 to a one-hundred and fiftieth spectrum S150.

The similarity change index calculator 220 may calculate the second similarity change index by calculating changes Δ1 to Δ148 of the calculated degrees of similarity sim1 to sim 149 and converting the calculated changes Δ1 to Δ148 into scores. The spectrum stability determiner 230 may compare the second similarity change index with a preset second threshold value of 3, and determine that the spectrum is stable when the second similarity change index is equal to or smaller than the second threshold value of 3.

Referring to FIGS. 4B and 4C, a second similarity change index 410 of FIG. 4B is smaller than the second threshold value of 3 at all of the sample times; while a second similarity change index 420 of FIG. 4C is greater than the second threshold value of 3 at some sample times. Thus, the spectrum stability determiner 230 may determine that the spectrum measured in FIG. 4B is stable, and may determine that the spectrum measured in FIG. 4C is unstable.

Figure 5B:
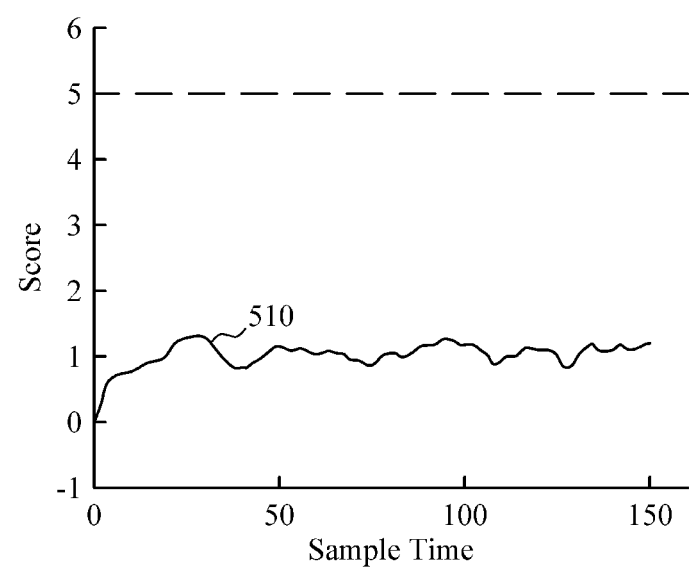
FIG. 5B is a graph showing an example of a result of calculating the third similarity change index.
Figure 5C:
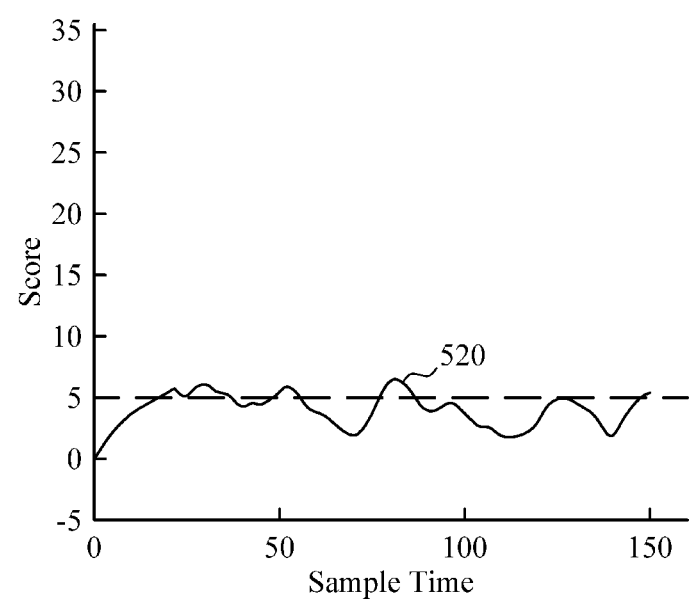
FIG. 5C is a graph showing another example of a result of calculating the third similarity change index.

FIGS. 5A, 5B, and 5C are diagrams for describing a method for determining the stability of spectra. In detail, FIG. 5A is a diagram for describing a method for calculating a third similarity change index, FIG. 5B is a graph showing an example of a result of calculating the third similarity change index, and FIG. 5C is a graph showing another example of a result of calculating the third similarity change index.

Referring to FIGS. 2 and 5A, the similarity calculator 210 may calculate degrees of similarity between any two spectra in possible sets of four consecutive spectra (i.e., a first spectrum S1 to a fourth spectrum S4, a second spectrum S2 to a fifth spectrum S5, . . . , and a one-hundred and forty-seventh spectrum S147 to a one-hundred and fiftieth spectrum S150). The similarity change index calculator 220 may calculate the third similarity change index by computing averages sa1 to sa147 of the similarities between any two spectra of a possible set of four consecutive spectra, and converting the computed averages sa1 to sa147 into respective scores. The spectrum stability determiner 230 may compare the calculated third similarity change index with a third threshold value of 5, and determine that the spectrum is stable when the third similarity change index is equal to or smaller than the third threshold value of 5.

Referring to FIGS. 5B and 5C, a third similarity change index 510 of FIG. 5B is smaller than the third threshold value of 5 at all of the sample times; while a third similarity change index 520 of FIG. 5C is greater than the third threshold value of 5 at some sample times. Thus, the spectrum stability determiner 230 may determine that the spectrum measured in FIG. 5B is stable, and may determine that the spectrum measured in FIG. 5C is unstable.

Figure 6A:
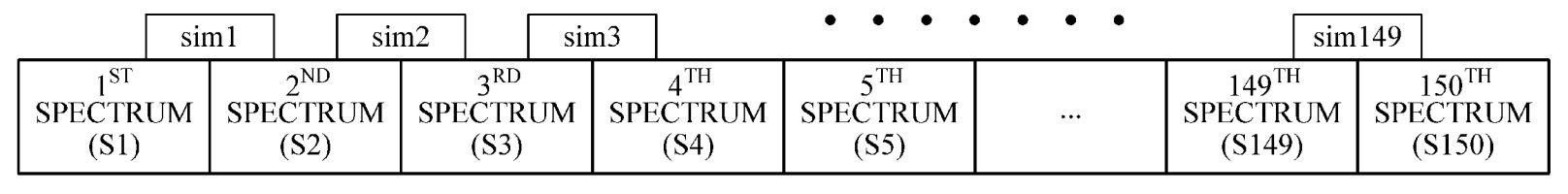
Figure 6B:
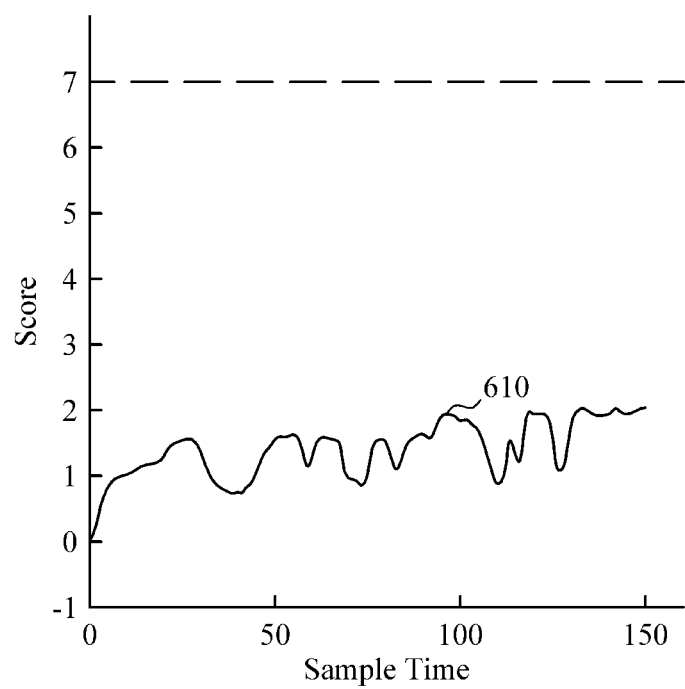
FIG. 6B is a graph showing an example of a result of calculating the fourth similarity change index.
Figure 6C:
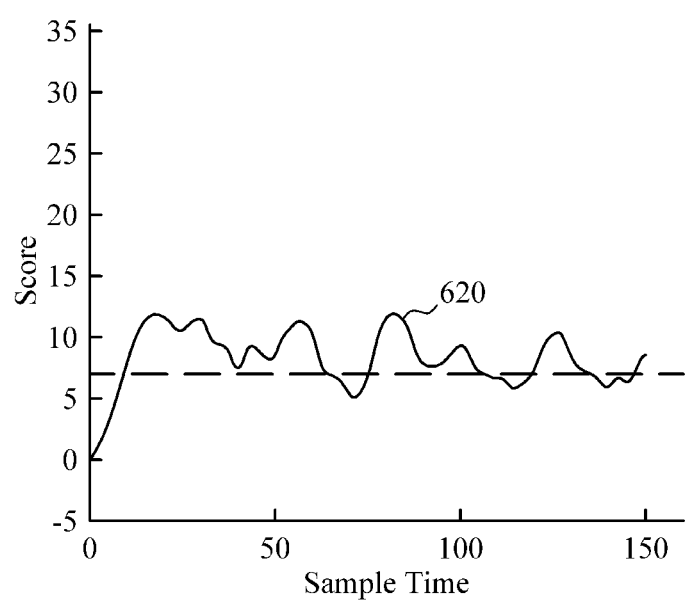
FIG. 6C is a graph showing another example of a result of calculating the fourth similarity change index.

FIGS. 6A, 6B, and 6C are diagrams for describing a method for determining the stability of spectra. In detail, FIG. 6A is a diagram for describing a method for calculating a fourth similarity change index, FIG. 6B is a graph showing an example of a result of calculating the fourth similarity change index, and FIG. 6C is a graph showing another example of a result of calculating the fourth similarity change index.

Referring to FIGS. 2 and 6A, the similarity calculator 210 calculates degrees of similarity between adjacent spectra, i.e., similarity sim1 between a first spectrum S1 and a second spectrum S2, similarity sim2 between the second spectrum S2 and a third spectrum S3, and up to similarity sim149 between a one-hundred and forty-ninth spectrum S149 and a one-hundred and fiftieth spectrum S150.

The similarity change index calculator 220 may calculate the fourth similarity change index by converting the degrees of similarity sim1 to sim149 calculated by the similarity calculator 210 into scores, and the spectrum stability determiner 230 may compare the calculated fourth similarity change index with a preset fourth threshold value of 7 and determine that the spectrum is stable when the fourth similarity change index is equal to or smaller than the fourth threshold value of 7.

Referring to FIGS. 6B and 6C, a fourth similarity change index 610 in FIG. 6B is smaller than the fourth threshold value of 7 at all of the sample times; while a fourth similarity change index 620 in FIG. 6C is greater than the third threshold value of 7 at some sample times. Thus, the spectrum stability determiner 230 may determine that the spectrum measured in FIG. 6B is stable, and may determine that the spectrum measured in FIG. 6C is unstable.

Figure 7:
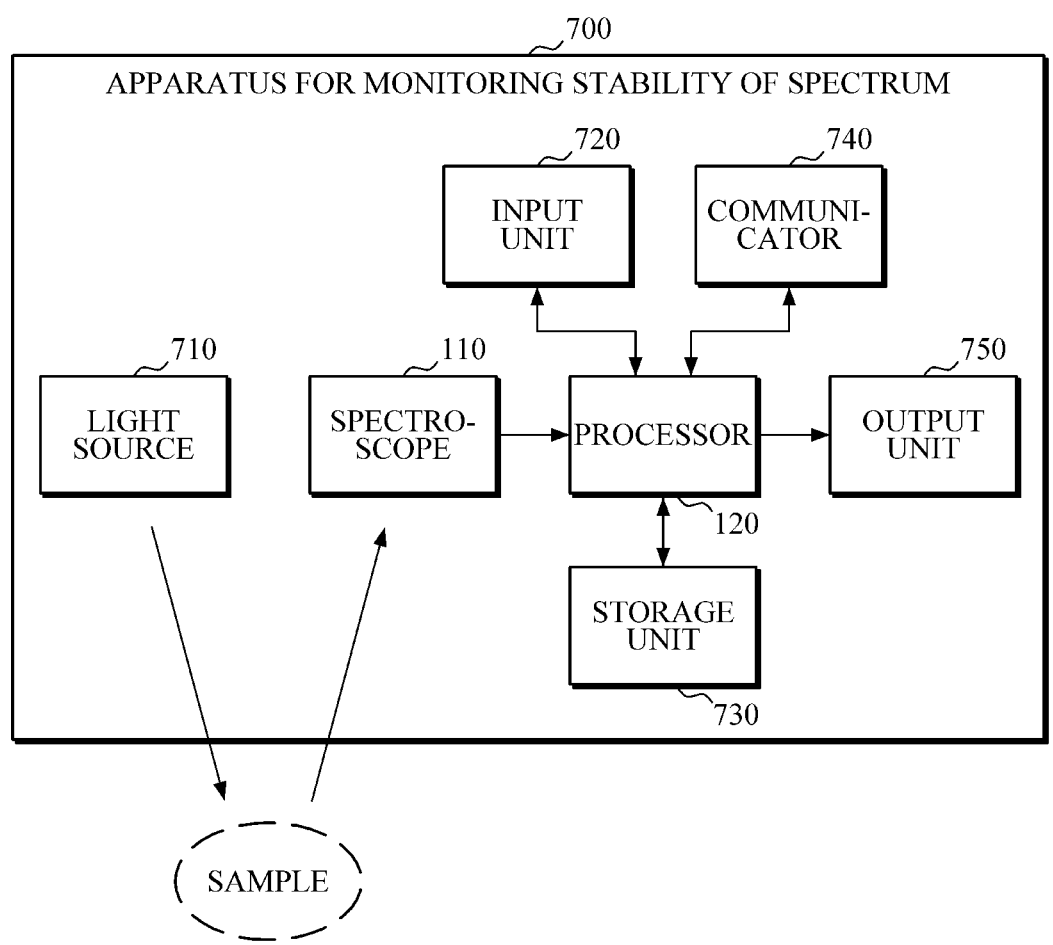
FIG. 7 is a block diagram illustrating another exemplary embodiment of an apparatus for monitoring a stability of a spectrum.

FIG. 7 is a block diagram illustrating another exemplary embodiment of an apparatus for monitoring a stability of a spectrum.

Referring to FIG. 7, the apparatus 700 for monitoring the stability of a spectrum includes a spectroscope 110, a processor 120, a light source 710, an input unit 720, a storage unit 730, a communicator 740, and an output unit 750. In this aspect, the spectroscope 110 and the processor 120 are configured to be the same as those described with reference to FIG. 1, and hence the detailed descriptions thereof will be omitted.

The light source 710 may emit light onto a sample.

The input unit 720 may receive any of various operation signals from a user. According to one exemplary embodiment, the input unit 720 may include any one or more of a key pad, a dome switch, a touch pad (resistive/capacitive) a jog wheel, a jog switch, a hardware button, and the like. In particular, when the touch pad forms a mutual layer structure with a display, it may be referred to as a touch screen.

The storage unit 730 may store a program or instructions for operations of the apparatus 700 for monitoring the stability of a spectrum and may store input/output data. In addition, the storage unit 730 may store measured spectrum data, computed similarity data, calculated similarity change index data, and the like.

The storage unit 730 may include any one or more of a flash memory, a hard disk, a micro type multimedia card, and a card type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. Further, the apparatus 700 for monitoring the stability of a spectrum may operate an external storage medium, such as a web storage, which performs the storage function of the storage unit 730 on the Internet.

The communicator 740 may communicate with an external device. For example, the communicator 740 may transmit the data input by the user via the input unit 720, the spectrum data measured by the spectroscope 110, and the spectrum stability determination result obtained by the processor 120 to the external device, or receive various data helpful for the determination of spectral stability from the external device.

In this case, the external device may include any one or more of a medical device which uses measured spectrum data, the spectral stability determination result, and the like, a printer for outputting the result, or a display device which displays the measured spectrum data or the spectral stability determination result. In addition, the external device may be any of a digital TV, a desktop computer, a mobile phone, a smartphone, a tablet computer, a notebook computer, a personal digital assistant (PDA), a portable multimedia player (PMP), a navigation system, an MP3 player, a digital camera, a wearable device, or the like, but is not limited thereto.

The communicator 740 may communicate with the external device by using any of a Bluetooth communication, Bluetooth low energy (BLE) communication, a near-field communication (NFC), a wireless local area network (WLAN) communication, a ZigBee communication, an infrared data association (IrDA) communication, a wireless fidelity (Wi-Fi) direct (WFD) communication, a ultra-wideband (UWB) communication, an Ant+ communication, a Wi-Fi communication, a radio frequency identification (RFID) communication, a 3G communication, a 4G communication, a 5G communication, and the like. However, these are only examples, and the type of communication is not limited thereto.

The output unit 750 may output the measured spectrum data, the spectrum stability determination result, and the like. According to one exemplary embodiment, the output unit 750 may output the measured spectrum data and the spectrum stability determination result in at least one of audible, visual, or tactile manners. To this end, the output unit 750 may include any one or more of a display, a speaker, a vibrator, and the like.

Figure 8:
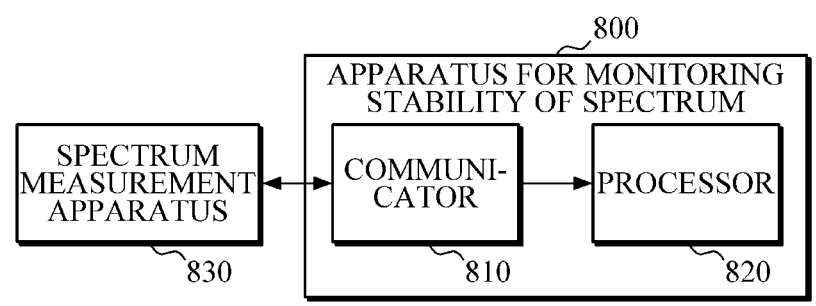
FIG. 8 is a block diagram illustrating still another exemplary embodiment of an apparatus for monitoring a stability of a spectrum.

FIG. 8 is a block diagram illustrating still another exemplary embodiment of an apparatus for monitoring a stability of a spectrum.

Referring to FIG. 8, the apparatus 800 for monitoring the stability of a spectrum includes a communicator 810 and a processor 820.

The communicator 810 may receive a spectrum of a sample measured in real time from a spectrum measurement apparatus 830 by using a communication technology. In this case, the communication technology may include, but is not limited to, any of a Bluetooth communication, BLE communication, an NFC, a WLAN communication, a ZigBee communication, an IrDA communication, a WFD communication, a UWB communication, an Ant+ communication, a Wi-Fi communication, an RFID communication, a 3G communication, a 4G communication, a 5G communication, and the like.

Meanwhile, the spectrum measurement apparatus 830 may measure the spectrum of the sample in response to a control signal. For example, in response to a control signal generated according to an input of a user or a control signal received from the apparatus 800 for monitoring the stability of a spectrum, the spectrum measurement apparatus 830 may measure the spectrum of the sample by driving a light source to emit light onto the sample, detecting light that is reflected from or that has propagated through the sample, and performing spectroscopy with respect to the detected light.

The spectrum measurement apparatus 830 may include a communication module that is capable of wired and/or wireless communication, and may transmit the measured spectrum data to the apparatus 800 for monitoring the stability of a spectrum via the communication module.

The spectrum measurement apparatus 830 may include a wearable device which can be worn on the user's body, but this is merely an example and the spectrum measurement apparatus 830 is not limited thereto. In this aspect, the spectrum measurement apparatus 830 is not particularity limited in terms of its size or portability. For example, the spectrum measurement apparatus 830 may be a device that is fixedly installed in a medical institution or the like and measures the spectrum of a sample.

Meanwhile, the processor 820 is the same as the processor described above with reference to FIGS. 1 and 2, other than that the processor 820 determines the stability of the spectrum received via the communicator 810, and hence, the detailed description thereof will be omitted.

Figure 9:
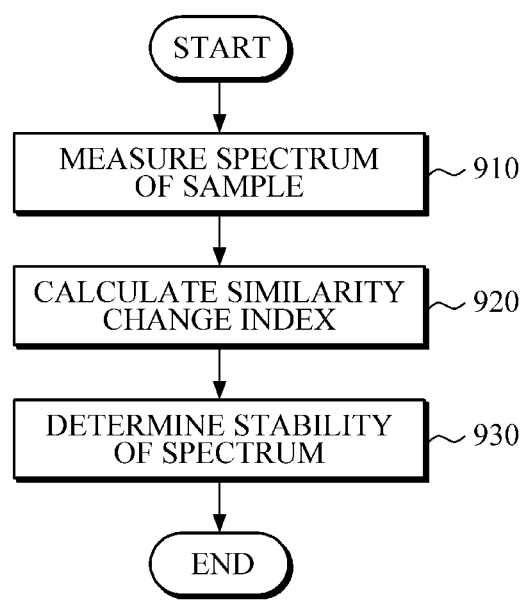
FIG. 9 is a flowchart illustrating an exemplary embodiment of a method for monitoring a stability of a spectrum.

FIG. 9 is a flowchart illustrating one exemplary embodiment of a method of monitoring a stability of a spectrum.

Referring to FIGS. 1, 7, and 9, the apparatus 100 and 700 for monitoring the stability of a spectrum measures a spectrum of a sample, as depicted in operation 910. For example, the apparatus 100 may detect light that is reflected from or that has propagated through the sample, and acquire the spectrum of the sample by performing spectroscopy with respect to the detected light. In addition, the apparatus 700 may radiate light onto the sample, detect light that is reflected from or that has propagated through the sample, and acquire the spectrum of the sample by performing spectroscopy upon the detected light.

The apparatus 100 and 700 for monitoring the stability of a spectrum calculates a similarity change index of the measured spectrum, as depicted in operation 920. For example, the apparatus 100 and 700 may calculate a degree of similarity between the measured spectra and calculate the similarity change index based on the calculated degree of similarity between the spectra.

The apparatus 100 and 700 determines the stability of the measured spectrum on the basis of the calculated similarity change index, as depicted in operation 930. For example, the apparatus 100 and 700 may compare the calculated similarity change index with a preset threshold value and determine the stability of the spectrum on the basis of the comparison result.

Figure 10:
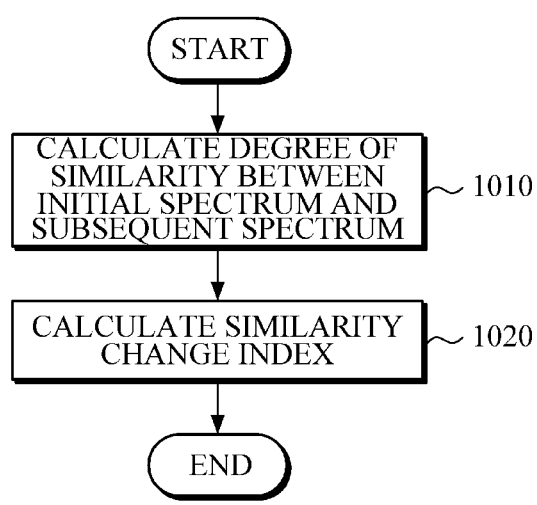
FIG. 10 is a flowchart illustrating an exemplary embodiment of a method for calculating a similarity change index.

FIG. 10 is a flowchart illustrating one exemplary embodiment of a method for calculating a similarity change index.

Referring to FIGS. 1, 7, and 10, the apparatus 100 and 700 for monitoring the stability of a spectrum calculates a degree of similarity between an initial spectrum and a subsequent spectrum, as depicted in operation 1010. For example, if five spectra (i.e., a first spectrum to a fifth spectrum) are measured, the apparatus 100 and 700 may calculate a degree of similarity between the first spectrum and a second spectrum, a degree of similarity between the first spectrum and a third spectrum, a degree of similarity between the first spectrum and a fourth spectrum, and a degree of similarity between the first spectrum and the fifth spectrum.

The apparatus 100 and 700 for monitoring stability of a spectrum calculates a similarity change index (i.e., a first similarity change index) by converting each of the calculated degrees of similarity into a score, as depicted in operation 1020.

Figure 11:
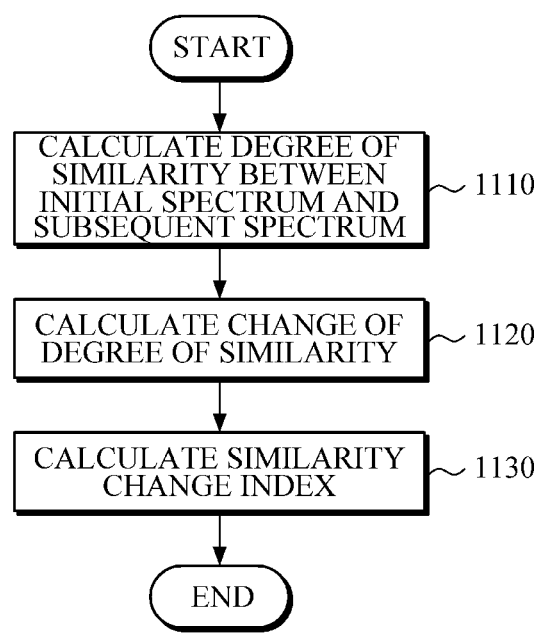
FIG. 11 is a flowchart illustrating another exemplary embodiment of a method for calculating a similarity change index.

FIG. 11 is a flowchart illustrating another exemplary embodiment of a method for calculating a similarity change index.

Referring to FIGS. 1, 7, and 11, the apparatus 100 and 700 for monitoring the stability of a spectrum calculates at least two degrees of similarity between an initial spectrum and subsequent spectra, as depicted in operation 1110, and calculates the change of the calculated degrees of similarity, as depicted in operation 1120.

The apparatus 100 and 700 calculates a similarity change index (i.e., a second similarity change index) by converting the calculated change into a score, as depicted in operation 1130.

Figure 12:
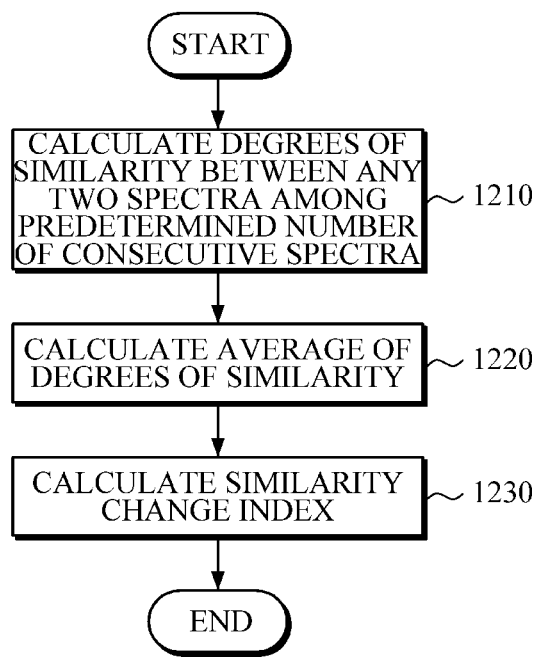
FIG. 12 is a flowchart illustrating still another exemplary embodiment of a method for calculating a similarity change index.

FIG. 12 is a flowchart illustrating still another exemplary embodiment of a method for calculating a similarity change index.

Referring to FIGS. 1, 7, and 12, the apparatus 100 and 700 for monitoring the stability of a spectrum calculates degrees of similarity between any two spectra among a predetermined number of consecutive spectra, as depicted in operation 1210. For example, if five spectra (i.e., a first spectrum to a fifth spectrum) are measured and the predetermined number is set to 3, with respect to the first, second, and third spectra (i.e., a first section), the apparatus 100 and 700 for monitoring the stability of a spectrum may calculate a degree of similarity between the first spectrum and a second spectrum, a degree of similarity between the first spectrum and a third spectrum, and a degree of similarity between the second spectrum and the third spectrum. In addition, with respect to the second, third, and fourth spectra (i.e., a second section), the apparatus 100 and 700 may calculate a degree of similarity between the second spectrum and the third spectrum, a degree of similarity between the second spectrum and the fourth spectrum, and a degree of similarity between the third spectrum and the fourth spectrum. Further, with respect to the third, fourth, and fifth spectra (i.e., a third section), the apparatus 100 and 700 may calculate a degree of similarity between the third spectrum and the fourth spectrum, a degree of similarity between the third spectrum and the fifth spectrum, and a degree of similarity between the fourth spectrum and the fifth spectrum.

The apparatus 100 and 700 calculates an average of the degrees of similarity calculated for the predetermined number of consecutive spectra, as depicted in operation 1220. For example, the apparatus 100 and 700 may calculate an average of the degrees of similarity between the spectra in the first section (the first, second, and third spectra), an average of the degrees of similarity between the spectra in the second section (the second, third, and fourth spectra), and an average of the degrees of similarity between the spectra in the third section (the third, fourth, and fifth spectra).

The apparatus 100 and 700 calculates a similarity change index (i.e., a third similarity change index) by converting the calculated average into a score, as depicted in operation 1230.

Figure 13:
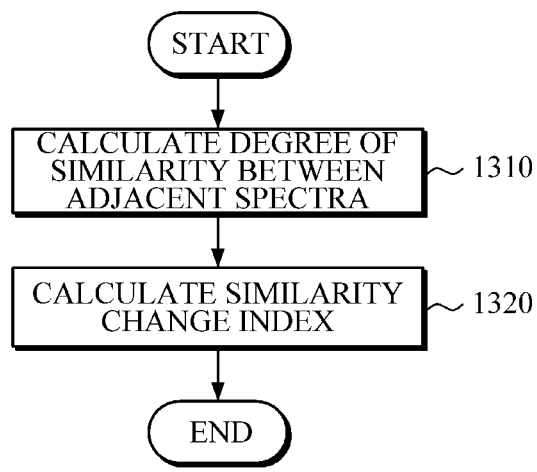
FIG. 13 is a flowchart illustrating yet another exemplary embodiment of a method for calculating a similarity change index.

FIG. 13 is a flowchart illustrating yet another exemplary embodiment of a method for calculating a similarity change index.

Referring to FIGS. 1, 7, and 13, the apparatus 100 and 700 for monitoring the stability of a spectrum calculates a degree of similarity between adjacent spectra, as depicted in operation 1310. For example, if five spectra (i.e., a first spectrum, a second spectrum, a third spectrum, a fourth spectrum, and a fifth spectrum) are measured, the apparatus 100 and 700 may calculate a degree of similarity between the first spectrum and a second spectrum, a degree of similarity between the second spectrum and a third spectrum, a degree of similarity between the third spectrum and a fourth spectrum, and a degree of similarity between the fourth spectrum and the fifth spectrum.

The apparatus 100 and 700 for monitoring the stability of a spectrum calculates a similarity change index (i.e., a fourth similarity change index) by converting the calculated degrees of similarity into scores, as depicted in operation 1320.

Meanwhile, the apparatus 100 and 700 may determine the stability of the measured spectra by using some or all of the calculated similarity change indices (the first similarity change index, the second similarity change index, the third similarity change index, and the fourth similarity change index) calculated by using the methods described above with reference to FIGS. 10, 11, 12, and 13. For example, the apparatus 100 and 700 may determine individually the stability of the measured spectra by using each similarity change index, and may make a final determination on the stability of the spectra by integrating the individual determinations.

Figure 14:
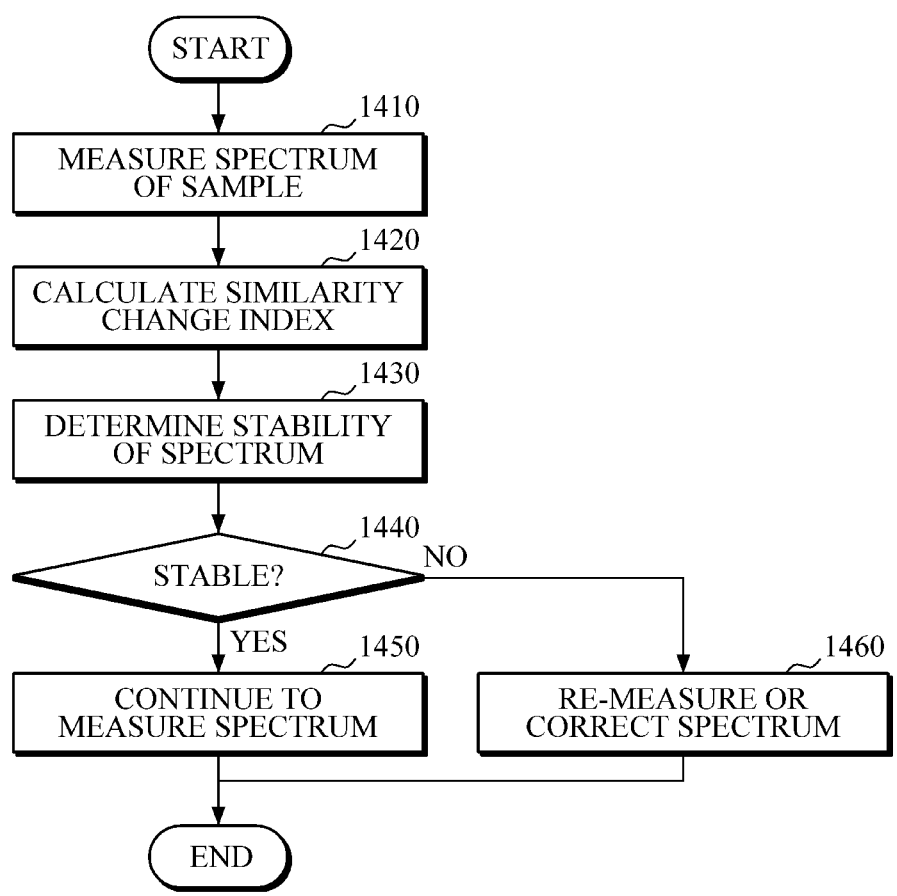
FIG. 14 is a flowchart illustrating another exemplary embodiment of a method for monitoring a stability of a spectrum.

FIG. 14 is a flowchart illustrating another exemplary embodiment of a method for monitoring a stability of a spectrum.

Referring to FIGS. 1, 7, and 14, the apparatus 100 and 700 for monitoring the stability of a spectrum measures a spectrum of a sample, as depicted in operation 1410, calculates a similarity change index for the measured spectrum, as depicted in operation 1420, and determines the stability of the measured spectrum on the basis of the calculated similarity change index, as depicted in operation 1430.

When it is determined in operation 1440 that the measured spectrum is stable, the apparatus 100 and 700 continues to measure the spectrum, as depicted in operation 1450.

When it is determined in operation 1440 that the measured spectrum is unstable, the apparatus 100 and 700 re-measures the spectrum of the sample from the beginning or corrects the spectrum determined to be unstable by using a predetermined algorithm, as depicted in operation 1460.

Figure 15:
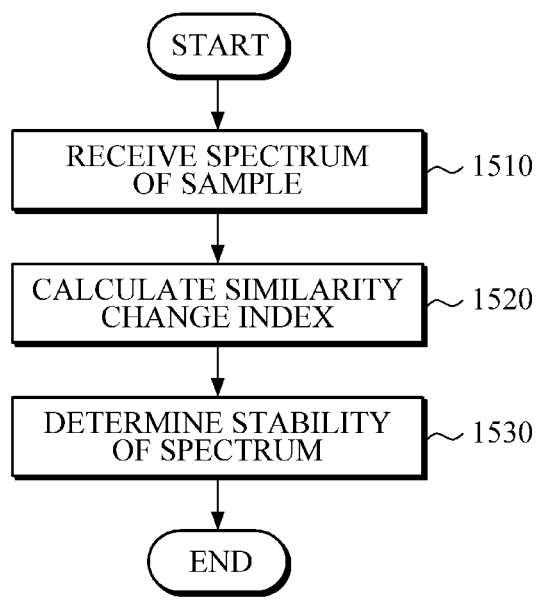
FIG. 15 is a flowchart illustrating yet another exemplary embodiment of a method for monitoring a stability of a spectrum.

FIG. 15 is a flowchart illustrating yet another exemplary embodiment of a method for monitoring a stability of a spectrum.

Referring to FIGS. 8 and 15, the apparatus 800 for monitoring the stability of a spectrum receives a spectrum of a sample measured in real time from a spectrum measurement apparatus by using a communication technology, as depicted in operation 1510.

The apparatus 800 for monitoring the stability of a spectrum calculates a similarity change index of the received spectrum, as depicted in operation 1520, and determines the stability of the measured spectrum on the basis of the calculated similarity change index, as depicted in operation 1530.

Figure 16:
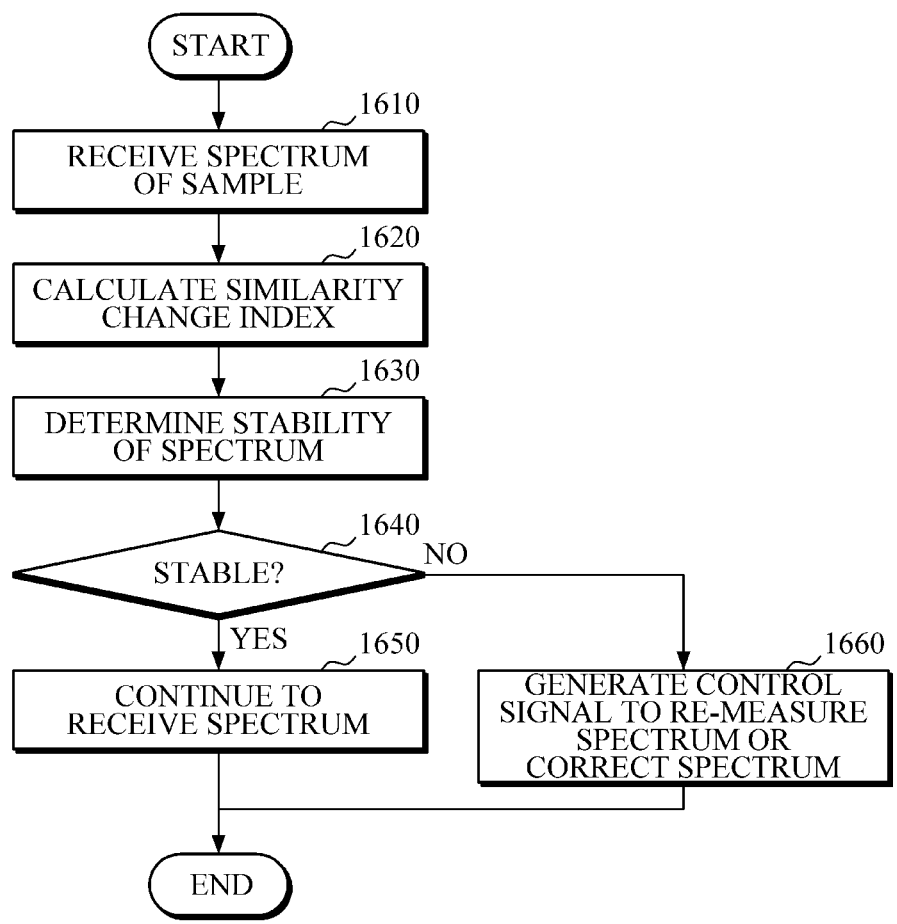
FIG. 16 is a flowchart illustrating still another exemplary embodiment of a method for monitoring a stability of a spectrum.

FIG. 16 is a flowchart illustrating still another exemplary embodiment of a method for monitoring a stability of a spectrum.

Referring to FIGS. 8 and 16, the apparatus 800 for monitoring the stability of a spectrum receives a spectrum of a sample measured in real time from a spectrum measurement apparatus by using a communication technology, as depicted in operation 1610, calculates a similarity change index of the received spectrum, as depicted in operation 1620, and determines the stability of the measured spectrum on the basis of the calculated similarity change index, as depicted in operation 1630.

When it is determined in operation 1640 that the measured spectrum is stable, the apparatus 800 continues to receive the spectrum, as depicted in operation 1650.

When it is determined in operation 1640 that the measured spectrum is unstable, the apparatus 800 generates a control signal such that the spectrum measurement apparatus re-measures the spectrum of the sample from the beginning, or corrects the spectrum determined to be unstable by using a predetermined algorithm, as depicted in operation 1660.

The current exemplary embodiments can be implemented as computer readable codes in a transitory or non-transitory computer readable recording medium. Codes and code segments constituting the computer program can be easily inferred by a skilled computer programmer in the art. The computer readable recording medium includes all types of recording media in which computer readable data are stored. Examples of the computer readable recording medium include a read-only memory (ROM), a random access memory (RAM), a compact disk-ROM (CD-ROM), a magnetic tape, a floppy disk, and an optical data storage. Further, the recording medium may be implemented in the form of a carrier wave such as Internet transmission. In addition, the computer readable recording medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for monitoring a spectrum stability, the apparatus comprising:
   a spectroscope configured to measure spectra of a sample, the spectra of the sample comprising an initial spectrum which is a first measured spectrum from the sample and a plurality of subsequent spectra which are spectra measured after the initial spectrum that are measured from the sample; and
   a processor configured to:
      determine a similarity change index of the spectra in a time domain based on differences between the initial spectrum and each of the plurality of subsequent spectra of the sample, in real time while measuring the spectra; and
      generate a control signal that causes the spectroscope to measure the spectra of the sample based on the similarity change index,
   wherein the plurality of subsequent spectra comprises a first subsequent spectrum and a second subsequent spectrum, and
   the processor is further configured to perform a time domain analysis on the spectra of the sample to calculate a first degree of similarity between the initial spectrum and the first subsequent spectrum in the time domain, to calculate a second degree of similarity between the initial spectrum and the second subsequent spectrum in the time domain, to calculate a change between the first degree of similarity and the second degree of similarity in the time domain, and to calculate the similarity change index in the time domain by converting the calculated change into a score,
   wherein the processor is configured to determine whether to control the spectroscope to measure the spectra further based on an average of at least two degrees of similarity between any two spectra from among a predetermined number of consecutive spectra, and
   wherein the processor is configured to compare the similarity change index with a preset threshold value to obtain a comparison result, and determine the spectrum stability based on the comparison result.

2. The apparatus of claim 1, wherein the spectroscope comprises a photodetector configured to detect light reflected from or propagated through the sample, and a spectrum obtainer configured to acquire the spectra by performing spectroscopy with respect to the detected light.

3. The apparatus of claim 1, further comprising: a light source configured to emit light onto the sample.

4. The apparatus of claim 1, wherein the processor is further configured to determine the similarity change index based on at least one from among a Euclidean distance, a Manhattan distance, a cosine distance, a Mahalanobis distance, a Jaccard coefficient, an extended Jaccard coefficient, a Pearson's correlation coefficient, and a Spearman's correlation coefficient.

5. The apparatus of claim 1, wherein the similarity change index is a first similarity change index, and
   wherein the processor is further configured to convert a first degree of similarity between the initial spectrum and a first subsequent spectrum into a first score, to calculate a second similarity change index by converting a change of the first degree of similarity into a second score, and to calculate a third similarity change index by calculating a second degree and a third degree of similarity between any two spectra from among a predetermined number of consecutive spectra and converting an average of the second and third degrees of similarity into a third score.

6. The apparatus of claim 5, wherein the processor is further configured to perform a first comparison between the first similarity change index and a preset first threshold value, to perform a second comparison between the second similarity change index and a preset second threshold value, and to perform a third comparison between the third similarity change index and a preset third threshold value, and to determine the spectrum stability by integrating results of the first, the second, and the third comparisons.

7. A method for monitoring a spectrum stability, the method comprising:
    measuring, by a spectroscope, spectra of a sample, the spectra comprising an initial spectrum which is a first measured spectrum from the sample and a plurality of subsequent spectra which are spectra measured after the initial spectrum that are measured from the sample;
    determining a similarity change index of the spectra in a time domain based on differences between the initial spectrum of the sample and each of the plurality of subsequent spectra of the sample, in real time while measuring the spectra;
    controlling the spectroscope to measure the spectra of the sample based on the similarity change index;
    comparing the similarity change index with a preset threshold value to obtain a comparison result; and
    determining the spectrum stability based on the comparison result,
    wherein the plurality of subsequent spectra comprises a first subsequent spectrum and a second subsequent spectrum, and
    wherein the determining of the similarity change index comprises performing a time domain analysis on the spectra of the sample by calculating a first degree of similarity between the initial spectrum and the first subsequent spectrum in the time domain, calculating a second degree of similarity between the initial spectrum and the second subsequent spectrum in the time domain, calculating a change between the first degree of similarity and the second degree of similarity in the time domain, and calculating the similarity change index in the time domain by converting the calculated change into a score,
    wherein the determining of the similarity change index comprises determining the similarity change index further based on an average of at least two degrees of similarity between any two spectra from among a predetermined number of consecutive spectra.

8. The method of claim 7, wherein the measuring of the spectra of the sample comprises emitting light onto the sample, detecting the light reflected from or propagated through the sample, and acquiring the spectra by performing spectroscopy with respect to the detected light.

9. The method of claim 7, wherein the determining of the similarity change index comprises determining the similarity change index based on at least one from among a Euclidean distance, a Manhattan distance, a cosine distance, a Mahalanobis distance, a Jaccard coefficient, an extended Jaccard coefficient, a Pearson's correlation coefficient, and a Spearman's correlation coefficient.

10. An apparatus for monitoring a spectrum stability, comprising:
    a communicator configured to receive, from a spectrum measurement apparatus, spectra of a sample measured in real time, the spectra comprising an initial spectrum which is a first measured spectrum and a plurality of subsequent spectra which are spectra measured after the initial spectrum; and
    a processor configured to:
        determine a similarity change index of the spectra in a time domain based on differences between the initial spectrum of the sample and each of the plurality of subsequent spectra of the sample, in real time while measuring the spectra; and
        generate a control signal that causes the spectrum measurement apparatus to measure the spectra of the sample based on the similarity change index by determining the similarity change index,
    wherein the plurality of subsequent spectra comprises a first subsequent spectrum and a second subsequent spectrum, and
    the processor is further configured to perform a time domain analysis on the spectra of the sample, calculate a first degree of similarity between the initial spectrum and the first subsequent spectrum in the time domain, to calculate a second degree of similarity between the initial spectrum and the second subsequent spectrum in the time domain, to calculate a change between the first degree of similarity and the second degree of similarity in the time domain, and to calculate the similarity change index in the time domain by converting the calculated change into a score,
    wherein the processor is further configured to calculate at least two degrees of similarity between any two spectra from among a predetermined number of consecutive spectra, to compute an average of the calculated at least two degrees of similarity, and to calculate the similarity change index by converting the computed average into a score, and
    wherein the processor is configured to compare the similarity change index with a preset threshold value to obtain a comparison result, and determine the spectrum stability based on the comparison result.

* * * * *